July 19, 1955   J. S. RODGERS   2,713,403
ENGINE GOVERNORS FOR AUTOMOTIVE VEHICLES
Filed Feb. 16, 1950   3 Sheets-Sheet 1

INVENTOR.
John S. Rodgers
BY
Klaird A. Fox
attorney

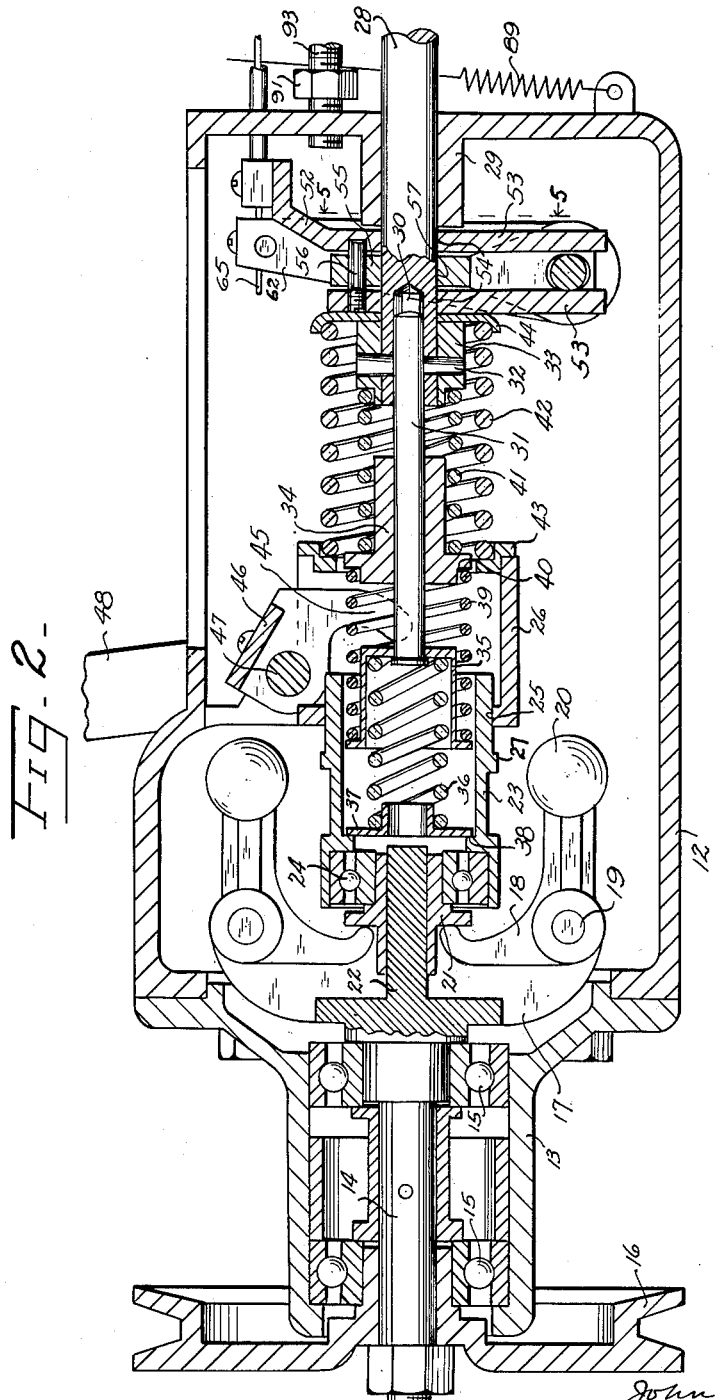

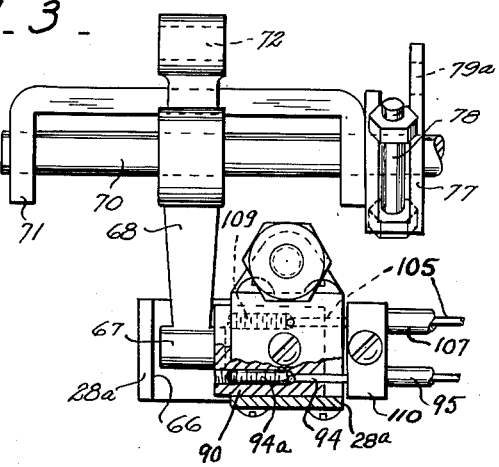

United States Patent Office 2,713,403
Patented July 19, 1955

2,713,403

ENGINE GOVERNORS FOR AUTOMOTIVE VEHICLES

John S. Rodgers, Racine, Wis.

Application February 16, 1950, Serial No. 144,562

11 Claims. (Cl. 192—3)

The invention relates to engine governors.

The general object of the invention is to provide an engine governor suitable for the control of the throttle valve or fuel control valve of an internal combustion engine used as a source of power especially for an automotive vehicle.

One of the special objects of the invention is to provide a governor, the governing speed of which may be readily adjusted by the operator's actuation of the vehicle's accelerator pedal and may be set at any desired value by the operator's setting operation of a hand control member.

A further object of the invention is to provide an engine governor which may be instantly released from its governing action either by the operator's application of the brake pedal of the vehicle or by a control associated with the accelerator pedal.

The invention further consists in the several features hereinafter set forth and more particularly described by claims at the conclusion hereof.

In the drawings:

Fig. 2 is a vertical sectional view through the governor;

Fig. 3 is a front view in elevation of the forward exterior governor mechanism, parts being broken away and parts being shown in section;

Fig. 4 is a detailed vertical sectional view taken on the line 4—4 of Fig. 1;

Fig. 5 is a detailed vertical sectional view taken on the line 5—5 of Fig. 2.

Figure 1:
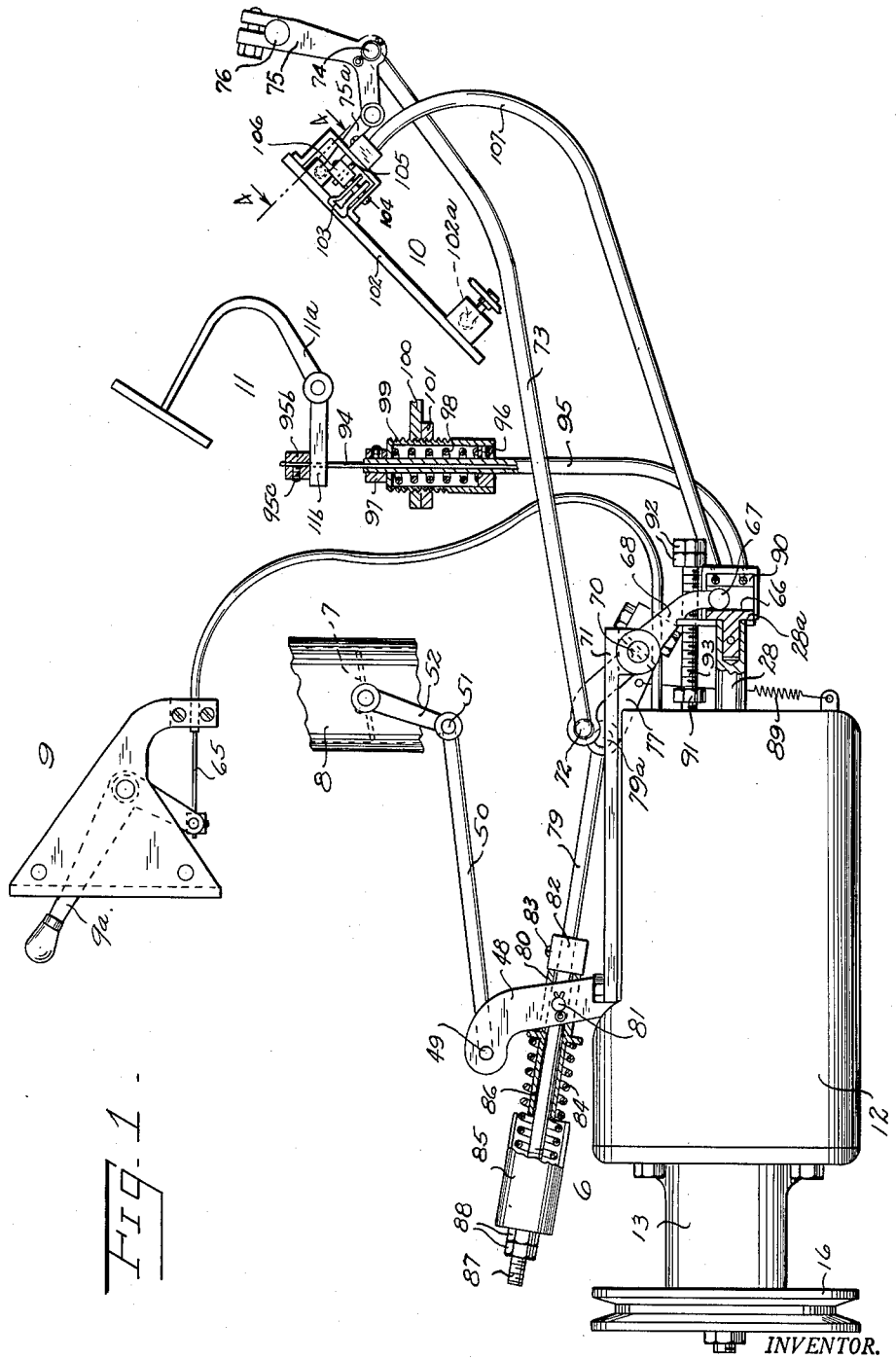
Fig. 1 is an elevation view of engine governing apparatus embodying the invention, parts being broken away and parts being shown in section.

Referring to Fig. 1, the governing apparatus includes the governor 6 for controlling the throttle valve 7 in the fuel intake conduit 8 of an engine (not shown), a governor loading control 9, a manual actuator in the form of an accelerator control 10, and a brake pedal control 11.

Referring to Figs. 1 and 2, the governor 6 includes a two part housing 12 whose cap 13 has an engine driven shaft 14 journalled therein in ball bearings 15 and provided with a pulley 16 adapted to be connected by a belt with a power take off shaft (not shown) of the engine whose speed is to be regulated.

The shaft 14 is the governor drive shaft and has a spider 17 formed thereon upon which the weighted bell crank levers or flyball members 18 are pivotally mounted at 19. The balls 20 are mounted on one of the arms of said levers 18 while the other arms engage a collar 21 slidably mounted on the spindle portion 22 of the shaft 14.

A sleeve 23 has a ball bearing journal connection 24 with the collar 21 upon which it is carried at one end and is slidably guided at its other end in a bore 25 formed in a fixed part 26 of the housing 12, said sleeve being limited in its movement by an annular stop flange 27 thereon engageable with said part 26.

A governor spring load control shaft 28 is slidably mounted to be locked in predetermined adjustable loading positions in a boss 29 in the housing 12. The inner end of shaft 28 has a bore 30 in which the outer end of a headed pin 31 is mounted and retained by a taper pin 32 extending through said pin 31 and shaft 28 and also through a collar 33 mounted on said shaft 28. A flanged collar 34 is slidably mounted on the intermediate portion of the pin 31 and a flanged cup 35 is slidably mounted on said pin at its head end.

A series of three load springs are placed in cascade arrangement in coaxial alinement with the shaft 28 and pin 31. The first load spring 36 is interposed between the interior of the base of the cup 35 and a flanged spring seat member 37 abutting a flange 38 with the sleeve 23. The second load spring 39 is interposed between the flanged edge of the cup 35 and a shoulder 40 of the collar 34. The third load spring 41 is interposed between the flange of the collar 34 and the collar 33. A spring 42 is interposed between a recessed collar 43 mounted in the fixed part 26 and a spring seat disk 44. The spring 36 is weaker than the spring 39 which in turn is weaker than the spring 41.

The sleeve 23 in its axial movement under the action of the weighted bell crank levers 18 is adapted to engage at its front edge with bifurcations 45 of an arm 46 fixed to a shaft 47 journalled in the part 26 and carrying an exteriorly disposed lever 48 whose outer end is pivotally connected at 49 with a link 50 pivotally connected at its other end 51 with the crank arm 52 of the butterfly throttle valve 7, Fig. 1.

The locking of shaft 28 in its predetermined loading positions is controlled by means of a settable cramp clutch interposed between spring seat disk 44 and boss 29 of housing 12. This cramp clutch comprises a relatively fixed clutch member 52 having vertically disposed spaced parallel checks 53 which carry alined openings 54 through which shaft 28 extends. Affixed between the checks 53 in member 52 and disposed above openings 54 is a pivot pin 56 upon which is pivotally mounted a movable clutch member 55 having a shaft opening 57 through which shaft 28 also passes. When openings 54—54 and 57 are axially alined, the shaft 28 is free to slide through them, but when the member 55 is swung to displace said openings from alinement, it cramps the shaft between it and the checks 53 of the member 52. For swinging said member 55 to apply this clutch stop its downwardly extending slotted end 58 is provided with a transverse cylindrical boss 59 adapted to be engaged by a mating concave cylindrical cam boss 60 on the upwardly bent end 61 of a lever 62 which is pivotally mounted in turn on a bolt 63 anchored to the lower extremity of fixed member 52 by means of a threaded connection therewith and a nut 64. With this arrangement when the lever 62 is in the position shown in Fig. 2, the clutch mechanism is released, but when the upper end of said lever 62 is swung toward the left by the downward swinging movement of the manual control lever 9a and the consequent movement of the Bowden wire 65 connected to said lever 62, the cam 60 will crowd the cylindrical cam 59 to the left as viewed in Fig. 5 and swing the lever 55 so as to cause the members 53—53 and 55 to clamp or cramp the shaft 28 between them.

The shaft 28 carries a head member 28a provided with a slot 66 (see Figs. 1 and 3) in which the headed end 67 of a lever 68 works. Lever 68 is pinned intermediate its ends to a pivot shaft 70 journalled in bracket 71 mounted on the housing, and its other end is pivotally connected at 72 to one end of a link 73 whose other end 74 is pivotally connected to the intermediate portion of an accelerator pedal mounting lever 75 pivoted on a fixed pivot 76.

The shaft 70 also has a crank arm 77 clamped to it by a bolt 78 which arm has a rod 79 pivotally connected to it at 79a. The rod 79 is slidably mounted in a sleeve 80 pivotally connected by a pin 81 with the intermediate portion of the lever 48. Rod 79 carries a stop collar 82 secured to it by a set screw 83 and against which one end of the sleeve 80 is yieldingly pressed by a spring 84 interposed between oppositely disposed sleeves 85 and 86 surrounding said rod. The outer end 87 of the rod 79 is threaded to take tension adjusting nuts 88. A spring 89 connected with the arm 77 and the housing 12 acts to swing said arm downwardly and hence allow movement of the shaft 28 toward the right to a load release position.

The headed end 67 of the lever 68 may be retained in position to engage the left hand side of slot 66 by a latch 90 which is mounted and suitably guided in head member 28a for transverse sliding movement relative thereto. The shaft 28 has a limited scope of longitudinal movement determined by the adjustment of a nut 91 and nuts 92 on a threaded rod 93 anchored in the housing. The latch 90 is operatively connected to the brake pedal 11a and the accelerator 10 in the manner about to be described. As shown in Fig. 3, the latch 90 is in retaining position overlapping the headed end 67 of the lever 68. The latch 90, however, can move bodily to the right with respect to its housing 28a and the headed end 67 so that the latter may be freed for movement toward throttle-closed position under the influence of spring 89.

The connection of the latch 90 with the brake pedal 11a is by a control wire 94 mounted in a wire housing 95. One end of the wire 94 is anchored by a screw 94a to the latch 90, and its other end extends through an opening 11b in the brake pedal and has a stop collar 95b clamped to it by screw 95c which collar engages one arm of said pedal. The wire housing 95 is secured to and rides with the head 28a at its lower end and carries a spring seat collar 96 and a stop collar 97 at its upper end. A spring 98 is interposed between the collar 96 and a housing 99 adjustably secured to a fixed member 100 by a nut 101.

The latch 90 is also connected to the accelerator pedal 102 which has a swivel mounting 102a at its lower end where it engages the floor of the automobile or machine on which the governor is mounted and which has an operating link 75a joined with the pedal mounting lever 75 at its upper end. The pedal 102 has a latch control auxiliary pedal or lever 103 pivotally mounted thereon at 104. A control wire 105 (see Fig. 4) is anchored at 106 to the longer arm of the lever 103 and extends through a housing 107 and is anchored at its other end in the latch 90 by a screw 109. Adjacent the latch 90 the housings 95 and 107 are clamped together by a clamp 110. The other end of the housing 107 is clamped by a screw 111 to the main pedal 102.

With the above construction and with the hand lever 9a in the position shown in the drawings the desired operating speed is set by first moving the foot pedal 102 of the accelerator down causing an inward movement of the shaft 28 by the clockwise swinging of the lever 68 through the link 73, lever 75 and link 103, thereby loading the governor springs so as to cause the engine to drive the vehicle at the desired speed. In doing so spring 84 is compressed to a certain extent. On reaching this desired speed the operator pulls down on the hand lever 9a locking the parts 53, 55 of the cramp clutch to the shaft 28 to establish the extent of the preloading of the governor. Under these conditions when the foot pressure on the accelerator pedal 102 is removed, the spring 89 acting on the lever 68 through the arm 77 will return the accelerator to its closed or initial position, but loading of the governor will be maintained. As the accelerator pedal 102 is again pushed down and the lever 68 swung clockwise, the arm 77 is also swung in the same direction, and through the rod 79 and the sleeve 80 and spring 84, which is again compressed, acts to swing the lever 48 clockwise which through the link 50 moves the butterfly valve 7 toward open position to increase the fuel supply and allow the engine to speed up. The spring 84 because it becomes compressed, functions although somewhat weakly, as a supplementary governor loading spring since it also yields to the force of the governor weights 18 acting through the collar 23, forked arm 46, and lever 48 on the sleeve 80 which action causes the lever 48 to regulate the position of the valve 7 without any movement of the rod 79.

With lever 68 and arm 77 moved in clockwise direction and held in place by either latch 90 or maintenance of foot pressure upon accelerator pedal 102 by the operator so as to maintain the dual function of spring 84, the following results occur: When the vehicle is running under control of the governor, the sleeve 23 contacts the arms 45 of member 46 forming a part of lever 48. When the vehicle because of grade, road condition, or otherwise runs at speeds less than the governor is set for, sleeve 23 moves to the left, which motion is followed by the lever 48 under the influence of springs 84, and as a result lever 48 swings in clockwise direction to increase the opening of throttle 7. When the vehicle, running down hill for example, tends to run at speeds greater than the governor is set for, sleeve moves to the right compelling lever 48 to move counterclockwise against the action of spring 84, thus reducing the opening of throttle 7.

The four springs 36, 39, 41, and 84 all oppose movement of the sleeve 23 by the weighted governor levers 18 under certain conditions. When the clutch stop 53, 55 is released and the accelerator 10 is pressed down, the shaft 28 is moved toward the left compressing the springs 36, 39, and 41 in that order due to their relative stiffness and preloading. When the shaft 28 is pushed in far enough for the cup 35 to contact the seat member 37, the governor weights being then in an open throttle position, the spring 36 is compressed into the cup 35 and maintains a fixed pressure as there is no movement of its coils. As the governor weights 18 tend to move out and move the sleeve 23, the springs 39, and 41 are compressed. The springs 39 and 41 are preloaded by the use of the pin 31. The collar 34 is free to move on the pin 31 so as to equalize the pressure between the springs 39 and 41. However, the movement between the coils of spring 39 will be greater than between the coils of spring 41. When the shaft 28 is moved in far enough for the cup 35 to come in contact with the collar 34, the coil movement of spring 39 stops, and any further movement is entirely on spring 41 which is smaller in diameter and of heavier wire than spring 39 which provides a much greater difference in pounds pressure for the movement of sleeve 23 between open and closed throttle. Thus, a governor setting for high speed will compress springs 36 and 39 to their minimum lengths and movement of sleeve 23 as acted upon by governor weights 18 will be dependent upon stiffness of spring 41, which stiffness requires a relative large increment in speed of governor weights 18 to produce the same movement of sleeve 23 as when the governor setting is for low speeds under which condition springs 36 and 39 are not fully compressed. Intermediate governor settings may and may not compress spring 36 to its minimum length. This differential in loading rate between high and low governor settings is necessary for correct regulation.

The spring 42 is not a governor spring but is used to hold the adjustable stop formed by the clutch members 53 and 55 against the end of boss 29. This stop can be locked to the shaft 28 from the lever 9a in any position to give the speed the operator wishes in the manner heretofore described. If the operator having locked the adjustable stop wishes to pass a vehicle which is moving at the same rate as he is, he pushes down on the accelerator with a heavy pressure sufficient to compress spring 42, and the other springs associated with the shaft 28 will additionally load the governor to permit the gaining of maximum speed while passing the other vehicle. Under these conditions the driver will automatically soon come back to normal speed as the pressure exerted by the spring 42 and the governor springs will be too tiresome to hold for a long period of time. The stop clutch 53, 55 when engaged and the shaft 28 move away from the boss 29 as a unit when the shaft 28 is moved, and therefore, they return to the same setting on the release of the exceptional accelerator pedal pressure. It takes only a light foot pressure on the accelerator to hold the lever 68 against the head 28a of the shaft 28 and the end 67 of this lever 68 can be locked in this position, by the latch 90, and the foot removed from the accelerator pedal and the car will continue to travel at the speed for which the governor is set.

The latch 90 is, as previously described, controlled either by the brake pedal or the accelerator 10. With the foot on the accelerator pedal 102, the operator may move the latch 90 by tipping one end or the other of the lever 103 (see Figs. 1 and 4) with his foot. Tipping the lever 103 downwardly on the side to which the wire 105 is connected will move the latch 90 inwardly to lock the lever 68 against the head 28a, and the operator's foot may be removed from the accelerator with the latch in locking position. Tipping of the opposite end of the lever 103 by the operator's foot will exert a pull on the wire 105 and move the latch 90 to a release position which allows the throttle valve 7 to return to the closed throttle position through the action of the spring 89 on the linkage above described. Also a small downward movement of the brake pedal 11 pulls the control wire 94 outwardly to release the latch 90 which allows the valve 7 to return to the closed throttle position.

The spring 98 is preloaded under the action of the seat collar 96 with enough pressure to hold the control wire casing or housing 95 until the latch is released, and then this spring 98 will yield and the casing 95 move with the control wire 94. With this arrangement the control wire 94 will not interfere with the movement of the brake pedal to apply the brakes on the wheels of the car since the housing 95 is free to move with said pedal during a brake application. As the first thing that the driver of a car usually does in making a quick stop is to apply the foot brake, his action in doing this will also act to release the latch 90, if set, and permit a movement of the lever 68 and the shaft 79 to a slow speed position. The connections of the brake linkages with the brake pedal 11 have not been shown but may be of any known or approved construction.

From the above description it will be noted that I have provided a governor for the throttle valve 7 of the engine movable to any desired speed limiting position by the accelerator pedal 102, settable at the desired maximum speed by the setting of the clutch stop on the governor spring tension control shaft 28 through the operation of the lever 9a and releasable from its speed controlling functions through the release of the latch 90 either by the brake pedal 11 or the pedal 103 associated with the accelerator 10.

Governors heretofore used on automotive vehicles such as trucks are so-called overspeed governors. The governor herein described is either a maximum limit or a constant speed governor settable under the control of the operator to any predetermined or desired speed.

I desire it to be understood that this invention is not to be limited to any specific form or arrangement of parts except insofar as such limitations are included in the claims.

What I claim as my invention is:

1. In an engine having a fuel control means and a foot control, the combination of an engine operated governor mechanism operatively connected to said fuel control means and including speed responsive means and preloaded spring means acting in opposition to said speed responsive means, means operated by said foot control for adjustably varying the working loading of said spring means, resilient means in addition to said spring means opposing movement of said foot control in the direction of loading of said spring means, settable stop means engageable with said means operated by said foot control when set rigidly restraining the said means operated by said foot control against movement in the unloading direction while allowing movement of the same in the loading direction against the restraint of said additional resilient means, and means under the control of the operator for closing said fuel control means regardless of the operation of said governor mechanism.

2. The structure as defined in claim 1 in which the means for closing the fuel control means is rendered operative by a control associated with the foot control.

3. The structure as defined in claim 1 in which the means for closing the fuel control means is rendered operative by the application of the brake pedal of the vehicle.

4. In an engine having a fuel control means and a foot control, the combination of an engine operated governor mechanism operatively connected to said fuel control means and including speed responsive means and preloaded spring means acting in opposition to said speed responsive means, a movable spring loading control shaft for said spring means, means operated by said foot control for moving said control shaft to adjustably vary the preloading of said spring means, a settable stop on said shaft to fix the loading of said spring means at the point of adjustment selected, and an independent control for said settable stop.

5. The structure as defined in claim 4 in which the settable stop is a clutch including a relatively fixed and movable shaft engaging members.

6. In an engine having a fuel control means and a foot control, the combination of an engine operated governor mechanism including speed responsive means and spring means acting in opposition to said speed responsive means, a member actuated by said governor mechanism and connected to said fuel control means to open and close the same, a movable spring loading control shaft for said spring means, a lever operatively connectible with said shaft and operable by said foot control for moving said control shaft to adjustably load said spring means, a settable stop on said shaft for fixing the loading of said spring means, a manually releasable connection for said lever with said shaft, an operative connection between said lever and said member, and means for moving said lever when released to move said member to close said fuel control means.

7. The structure as defined in claim 6 in which the releasable connection for said lever is a latch on said shaft operable by the operator's application of the brake pedal of the vehicle.

8. The structure as defined in claim 6 in which the releasable connection for said lever is a latch on said shaft operable by a foot control member mounted on said foot control.

9. In an engine having a fuel control and a manual actuator therefor, the combination of an engine operated governor having speed responsive means, loadable spring means engaging and opposing displacement of said speed responsive means, said loadable spring means comprising a cascade of loading springs, the loading rates of which vary one from the other, preloading means cooperatively engaging said loadable spring means and adapted to preload the same, a linkage connecting said fuel control to said governor to be actuated thereby, means including resilient displaceable means operatively connecting said manual actuator through said resiliently displaceable means to said linkage, means connecting said manual actuator to said preloading means adapted to transmit a preload from said manual actuator to said loadable spring means, and a releasable clutch mechanism adapted to engage said preloading means to grip the same and to maintain a predetermined preload transmitted thereto by said manual actuator.

10. In an engine having a fuel control and a manual actuator therefor, the combination of an engine operated governor having speed responsive means, spring means engaging and opposing displacement of said speed responsive means, said spring means comprising a cascade of loading springs the loading rates of which vary one from the other, a linkage connecting said fuel control to said governor to be actuated thereby, and a preloading means, actuated by said actuator, engaging said spring means and adapted to transmit a predetermined preload thereto.

11. In an engine having a fuel control means and a foot control therefor, the combination of an engine operated governor mechanism operatively connected to said fuel control means and including speed responsive means and preloaded spring means acting in opposition to said speed responsive means, means operable by said foot control for adjustably varying the preload loading of said spring means, a settable stop for fixing the preload of said spring means, control for setting and releasing said settable stop, and an independently controllable instantly releasable latch interposed between said foot control and the governor preloading spring means operable upon release to immediately reduce the preloading of said governor spring means to cause reduction of fuel by said fuel control means.

References Cited in the file of this patent

UNITED STATES PATENTS

| | | |
|---|---|---|
| 1,620,764 | Hull | Mar. 15, 1927 |
| 1,924,228 | Bull | Aug. 29, 1933 |
| 2,014,854 | Lothrop | Sept. 17, 1935 |
| 2,076,460 | Heinrich | Apr. 6, 1937 |
| 2,167,110 | Gutenberg | July 25, 1939 |
| 2,283,478 | Warren | May 19, 1942 |
| 2,402,851 | Sobie | June 25, 1946 |
| 2,519,510 | Smith | Aug. 22, 1950 |
| 2,521,593 | McNutt | Sept. 5, 1950 |